(12) United States Patent
Miller

(10) Patent No.: US 11,872,481 B2
(45) Date of Patent: *Jan. 16, 2024

(54) OPTICAL SYSTEMS AND ELEMENTS WITH PROJECTION STABILIZATION AND INTERACTIVITY

(71) Applicant: CFPH, LLC, New York, NY (US)

(72) Inventor: Mark Miller, Chicago, IL (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/178,176

(22) Filed: Feb. 17, 2021

(65) Prior Publication Data

US 2021/0170272 A1 Jun. 10, 2021

Related U.S. Application Data

(63) Continuation of application No. 16/701,944, filed on Dec. 3, 2019, now Pat. No. 10,926,167, which is a continuation of application No. 16/269,761, filed on Feb. 7, 2019, now Pat. No. 10,518,175, which is a continuation of application No. 15/973,283, filed on
(Continued)

(51) Int. Cl.
| | |
|---|---|
| *A63F 13/26* | (2014.01) |
| *A63F 13/332* | (2014.01) |
| *G07F 17/32* | (2006.01) |
| *G06T 7/70* | (2017.01) |
| *H04N 23/90* | (2023.01) |
| *A63F 13/31* | (2014.01) |

(Continued)

(52) U.S. Cl.
CPC .............. *A63F 13/26* (2014.09); *A63F 13/31* (2014.09); *A63F 13/332* (2014.09); *G06T 7/70* (2017.01); *G07F 17/3211* (2013.01); *G07F 17/3218* (2013.01); *H04N 23/90* (2023.01); *H04W 4/02* (2013.01); *A63F 2300/301* (2013.01); *A63F 2300/406* (2013.01); *A63F 2300/5573* (2013.01); *H04W 4/029* (2018.02)

(58) Field of Classification Search
CPC ......... H04N 21/41407; H04N 21/4122; H04N 21/440263; H04N 21/2402; H04N 21/242; H04N 21/4305; H04N 21/637; H04N 21/43637; H04N 21/234363; H04N 23/61; H04N 23/661; G06T 11/60; G06T 2207/20221; G06T 2207/10004; G06T 2215/16; G06T 2207/10024; G06Q 30/00
USPC ............... 370/328, 329, 330, 331; 455/556.1
See application file for complete search history.

(56) References Cited

U.S. PATENT DOCUMENTS

| | | |
|---|---|---|
| 5,982,541 A | 11/1999 | Li et al. |
| 6,538,705 B1 | 3/2003 | Higurashi et al. |

(Continued)

FOREIGN PATENT DOCUMENTS

| | | |
|---|---|---|
| CN | 1992914 | 7/2007 |
| WO | WO 2004/064410 | 7/2004 |

OTHER PUBLICATIONS

US Ex Parte Quale Action for U.S. Appl. No. 12/576,619, Sep. 25, 2012; 8 pages.

(Continued)

*Primary Examiner* — David Q Nguyen

(57) ABSTRACT

Apparatus and method related to projections and/or computing devices are described. Projections may be made from multiple computing devices to create a presentation. Various other embodiments are described.

15 Claims, 5 Drawing Sheets

Related U.S. Application Data

May 7, 2018, now Pat. No. 10,232,257, which is a continuation of application No. 14/827,410, filed on Aug. 17, 2015, now Pat. No. 9,962,609, which is a continuation of application No. 13/936,524, filed on Jul. 8, 2013, now Pat. No. 9,113,292, which is a continuation of application No. 12/576,619, filed on Oct. 9, 2009, now Pat. No. 8,483,756.

(51) Int. Cl.
*H04W 4/02* (2018.01)
*H04W 4/029* (2018.01)

(56) References Cited

U.S. PATENT DOCUMENTS

| | | | |
|---|---|---|---|
| 6,940,529 B2 | 9/2005 | Deering et al. | |
| 7,097,108 B2 | 8/2006 | Zellner et al. | |
| 7,852,315 B2 | 12/2010 | Ofek | |
| 8,943,164 B2 | 1/2015 | Kies | |
| 9,094,615 B2 | 7/2015 | Aman | |
| 9,113,292 B2 | 8/2015 | Miller | |
| 9,456,298 B2 * | 9/2016 | Lee | H04W 4/029 |
| 9,917,866 B2 | 3/2018 | Zhang et al. | |
| 9,962,609 B2 | 5/2018 | Milller | |
| 10,102,509 B2 * | 10/2018 | Arceneaux | G06Q 20/3274 |
| 10,232,257 B2 | 3/2019 | Miller | |
| 10,278,028 B2 * | 4/2019 | Stewart | H04W 8/005 |
| 10,518,175 B2 | 12/2019 | Miller | |
| 2002/0077896 A1 | 6/2002 | Liu | |
| 2005/0037843 A1 | 2/2005 | Wells et al. | |
| 2006/0018025 A1 | 1/2006 | Sharon et al. | |
| 2007/0027960 A1 | 2/2007 | De Leon | |
| 2007/0047043 A1 | 3/2007 | Kapellner et al. | |
| 2007/0247393 A1 | 10/2007 | Kuroki | |
| 2008/0018591 A1 | 1/2008 | Pittel et al. | |
| 2008/0102957 A1 | 5/2008 | Burman et al. | |
| 2008/0247128 A1 | 10/2008 | Khoo et al. | |
| 2008/0305875 A1 | 12/2008 | Heim et al. | |
| 2009/0046252 A1 | 2/2009 | Heym et al. | |
| 2009/0096917 A1 | 4/2009 | De Vaan et al. | |
| 2009/0143014 A1 | 6/2009 | Honda | |
| 2009/0197684 A1 | 8/2009 | Arezina et al. | |
| 2009/0219380 A1 | 9/2009 | Cable et al. | |
| 2010/0311493 A1 | 12/2010 | Miller et al. | |
| 2012/0143496 A1 | 6/2012 | Chitre | |
| 2012/0262532 A1 * | 10/2012 | Poon | H04N 7/15 348/14.02 |
| 2013/0084984 A1 * | 4/2013 | Gagner | G07F 17/3223 463/39 |
| 2013/0176539 A1 | 7/2013 | Kilcher | |
| 2013/0295960 A1 | 11/2013 | Miller | |
| 2013/0311310 A1 * | 11/2013 | Zell | G06Q 30/0633 705/15 |
| 2014/0137002 A1 | 5/2014 | Munson | |
| 2014/0349271 A1 | 11/2014 | Beavers | |
| 2015/0123889 A1 | 5/2015 | Willis | |
| 2015/0205558 A1 | 7/2015 | Oike | |
| 2016/0057203 A1 | 2/2016 | Garden Fors et al. | |
| 2017/0127128 A1 | 5/2017 | Seger | |
| 2017/0147095 A1 | 5/2017 | Nicholls et al. | |
| 2017/0150537 A1 | 5/2017 | Dow | |
| 2018/0256973 A1 | 9/2018 | Miller | |
| 2020/0171379 A1 | 6/2020 | Milller | |

OTHER PUBLICATIONS

U.S. Notice of Allowance for U.S. Appl. No. 12/576,619, dated Mar. 7, 2013; 7 pages.

US Ex Parte Quale Action for U.S. Appl. No. 13/936,524, Nov. 1, 2013; 10 pages.

* cited by examiner

OPTICAL SYSTEMS AND ELEMENTS WITH PROJECTION STABILIZATION AND INTERACTIVITY

CROSS REFERENCE TO RELATED APPLICATIONS

The present application is a continuation of U.S. patent application Ser. No. 16/701,944 filed Dec. 3, 2019 which is a continuation of U.S. patent application Ser. No. 16/269,761 filed on Feb. 7, 2019 (now U.S. Pat. No. 10,518,175 issued on Dec. 31, 2019) which is a continuation of U.S. patent application Ser. No. 15/973,283 filed on May 7, 2018 (now U.S. Pat. No. 10,232,257 issued on Mar. 19, 2019) which is a continuation of U.S. patent application Ser. No. 14/827,410 filed on Aug. 17, 2015 (now U.S. Pat. No. 9,962,609 issued on May 8, 2018), which is a continuation of U.S. patent application Ser. No. 13/936,524 filed on Jul. 8, 2013 (now U.S. Pat. No. 9,113,292 issued on Aug. 18, 2015), which is a continuation of U.S. patent application Ser. No. 12/576,619 filed on Oct. 9, 2009 (now U.S. Pat. No. 8,483,756 issued Jul. 9, 2013), each of which is incorporated by reference herein in its entirety.

DETAILED DESCRIPTION

Figure 1:
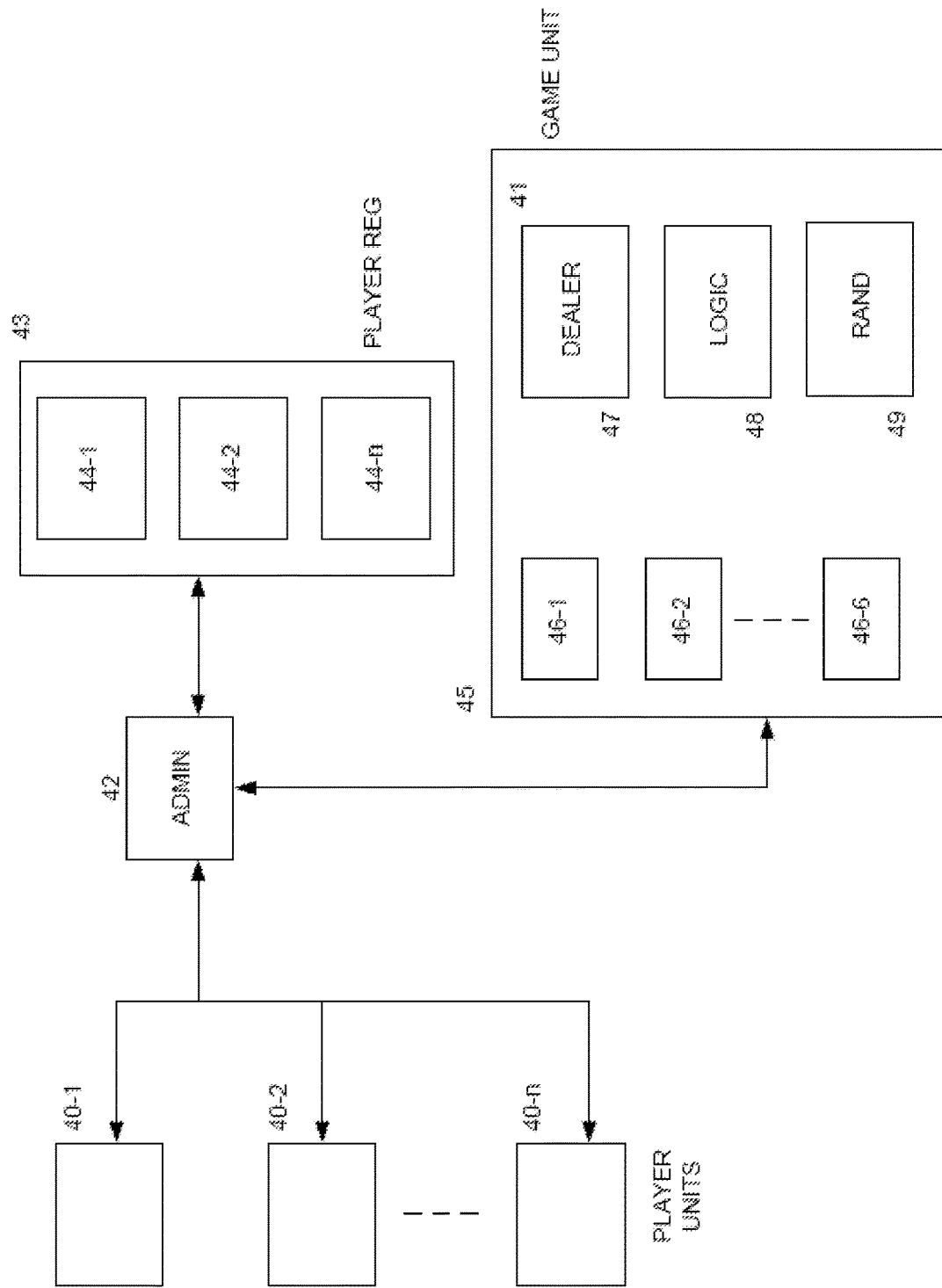
FIG. 1 shows an apparatus for playing a game, according to some embodiments.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Cards

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards. Other types of playing cards are described herein, but it should be recognized that various topics may apply to any, some, and/or all type of playing cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XII. Rules of Card Games

Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five—as in five-card draw—or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold'em and Omaha hold'em, respectively.

Poker Hand Rankings

Straight Flush

A straight flush is a poker hand such as Q♠ J♠ 10♠ 9♠ 8♠, which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣ is known as a royal flush, and is the highest ranking standard poker hand (excluding five of a kind).

Examples

7♦ 6♥ 5♥ 4♥ 3♥ beats 5♠ 4♠ 3♠ 2♠ A♠

J♣ 10♣ 9♣ 8♣ 7♣ ties J♦ 10♦ 9♦ 8♦ 7♦

Four of a Kind

Four of a kind, or quads, is a poker hand such as 9♣ 9♠ 9♦ 9♥J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples

10♣ 10♦ 10♥ 10♠ 5♦ ("four tens" or "quad tens") defeats 6♦ 6♥ 6♠ 6♣ K♠ ("four sixes" or "quad sixes")

10♣ 10♦ 10♥ 10♠ Q♣ ("four tens, queen kicker") defeats 10♣ 10♦ 10♥ 10♠ 5♦ ("four tens with a five")

Full House

A full house, also known as a boat or a full boat, is a poker hand such as 3♣ 3♠ 3♦ 6♣ 6♥, which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples

10♠ 10♥ 10♦ 4♠ 4♦ ("tens full") defeats 9♥ 9♣ 9♠ A♥ A♣ ("nines full")

K♠ K♣ K♥ 3♦ 3♠ ("kings full") defeats 3♠ 3♥ 3♦ K♠ K♦ ("threes full")

Q♥ Q♦ Q♣ 8♥ 8♣ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples

A♥ Q♥ 10♥5♥ 3♥ ("ace-high flush") defeats K♠ Q♠ J♠ 9♠ 6♠ ("king-high flush")

A♦ K♦ 7♦ 6♦ 2♦ ("flush, ace-king high") defeats A♥ Q♥ 10♥5♥ 3♥ ("flush, ace-queen high")

Q♥ 10♥ 9♥ 5♥ 2♥ ("heart flush") ties Q♠ 10♠ 9♠ 5♠ 2♠ ("spade flush")

Straight

A straight is a poker hand such as Q♣ J♠ 10♠ 9♥ 8♥, which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in "queen-high straight" or "straight to the queen".

A hand such as A♣ K♣ Q♦ J♠ 10♠ is an ace-high straight, and ranks above a king-high straight such as K♥ Q♠ J♥ 10♥ 9♦. But the ace may also be played as a 1-spot in a hand such as 5♠ 4♦ 3♠ 2♠ A♣, called a wheel or five-high straight, which ranks below the six-high straight 6♠ 5♣ 4♠ 3♥ 2♥. The ace may not "wrap around", or play both high and low in the same hand: 3♣ 2♦ A♠ K♠ Q♣ is not a straight, but just ace-high no pair.

Examples

8♠ 7♠ 6♥ 5♥ 4♠ ("eight-high straight") defeats 6♦ 5♠ 4♦ 3♥ 2♣ ("six-high straight")

8♠ 7♠ 6♥ 5♥ 4♠ ties 8♥ 7♦ 6♣ 5♣ 4♥

Three of a Kind

Three of a kind, also called trips, set or a prile, is a poker hand such as 2♦ 2♠ 2♥ K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples

8♠ 8♥ 8♦ 5♠ 3♣ ("three eights") defeats 5♣ 5♥ 5♦ Q♦ 10♣ ("three fives")

8♠ 8♥ 8♦ A♣ 2♦ ("three eights, ace kicker") defeats 8♠ 8♥ 8♦ 5♠ 3♣ ("three eights, five kicker")

Two Pair

A poker hand such as J♥ J♣ 4♣ 4♠ 9♠, which contains two cards of the same rank, plus two cards of another rank (that match each other but not the first pair), plus one unmatched card, is called two pair. It ranks above one pair and below three of a kind.

Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠ 9♦), as in "Kings over nines", "Kings and nines" or simply "Kings up".

Examples

K♥ K♦ 2♣ 2♦ J♥ ("kings up") defeats J♦ J♠ 10♠ 10♣ 9♠ ("jacks up")

9♣ 9♦ 7♦ 7♠ 6♥ ("nines and sevens") defeats 9♥ 9♠ 5♥ 5♦ K♣ ("nines and fives")

4♠ 4♣ 3♠ 3♥ K♦ ("fours and threes, king kicker") defeats 4♥ 4♦ 3♦ 3 10♠ ("fours and threes with a ten")

One Pair

One pair is a poker hand such as 4♥ 4♠ K♠ 10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples

10♣ 10♠ 6♠ 4♥ 2♥ ("pair of tens") defeats 9♥ 9♣ A♥ Q♦ 10♦ ("pair of nines")

10♥ 10♦ J♦ 3♥ 2♦ ("tens with jack kicker") defeats 10♣ 10♠ 6♠ 4♥ 2♥ ("tens with six kicker")

2♦ 2♥ 8♠ 5♣ 4♣ ("deuces, eight-five-four") defeats 2♣ 2♠ 8♣ 5♥ 3♥ ("deuces, eight-five-three")

High Card

A high-card or no-pair hand is a poker hand such as K♥ J♣ 8♣ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

Examples

A♦ 10♦ 9♠ 5♣ 4♣ ("ace high") defeats K♣ Q♦ J♣ 8♥ 7♥ ("king high")

A♣ Q♣ 7♦ 5♥ 2♣ ("ace-queen") defeats A♦ 10♦ 9♠ 5♣ 4♣ ("ace-ten")

7♠ 6♣ 5♣ 4♦ 2♥ ("seven-six-five-four") defeats 7♣ 6♦ 5♦ 3♥ 2♣ ("seven-six-five-three")

Decks Using a Bug

The use of joker as a bug creates a slight variation of game play. When a joker is introduced in standard poker games it functions as a fifth ace, or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that must qualify. As the dealer's hand is partially concealed during play (usually only one card, at most) is displayed to the player before player wagering is complete), the player must always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer must hit until he has a point total of at least 17, regardless of what the players have. In most casinos, the dealer must also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural' (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

XIII. Casino Countermeasures

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XIV. Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XV. Apparatus for Playing Over a Communications System

FIG. 1 shows apparatus for playing the game. There is a plurality of player units 40-1 to 40-*n* which are coupled via a communication system 41, such as the Internet, with a game playing system comprising an administration unit 42, a player register 43, and a game unit 45. Each unit 40 is typically a personal computer with a display unit and control means (a keyboard and a mouse).

When a player logs on to the game playing system, their unit 40 identifies itself to the administration unit. The system holds the details of the players in the register 43, which contains separate player register units 44-1 to 44-*n* for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40, and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XVI. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XVII. References

The following patents and patent applications are hereby incorporated by reference herein for all purposes: U.S. Pat. Nos. 6,579,181, 6,299,536, 6,093,103, 5,941,769, 7,114,718, U.S. patent application Ser. No. 10/622,321, U.S. Pat. Nos. 4,515,367, 5,000,453, 7,137,630, and 7,137,629.

XVIII. Example Embodiments

Some embodiments may include one or more computing devices making one or more projections to create a presentation. In some embodiments, multiple computing devices may operate under the control of an external central authority, may operate in a peer to peer manner, may operate in a master-slave relationship, and/or may operate in any other manner. In some embodiments, a first projection and second projection each may be projected from respective computing devices in a manner that accounts for position(s) of one or more of the computing devices and/or action(s) in an application running on one or more of the computing devices.

Figure 2:
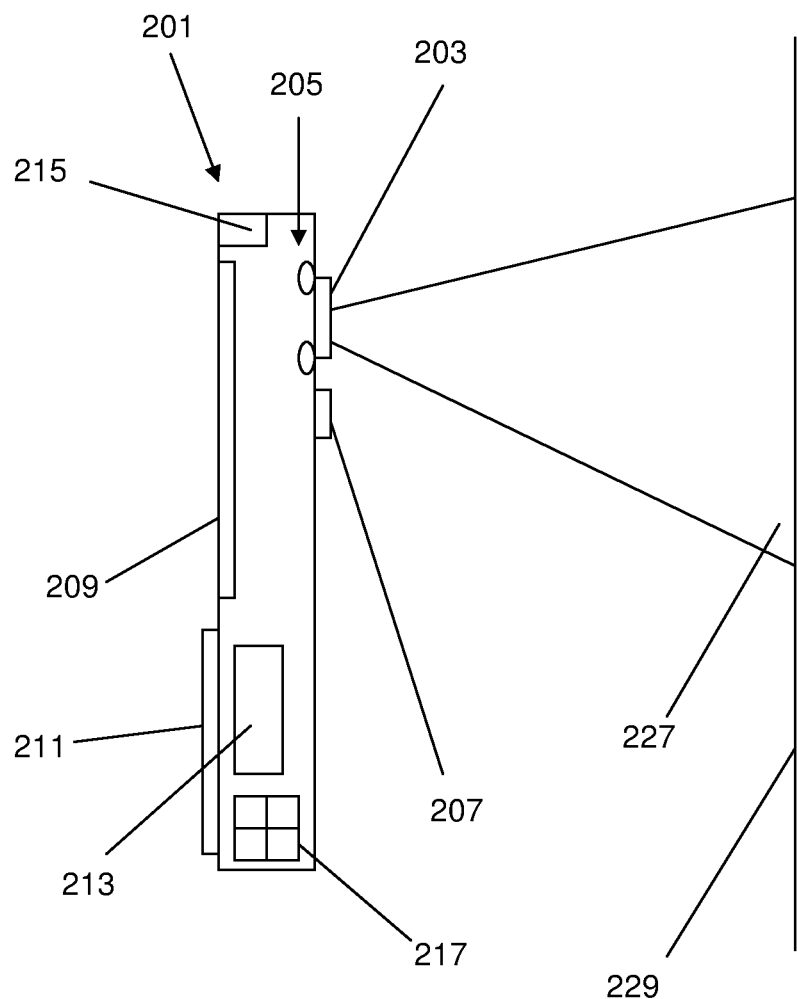
FIG. 2 shows an example mobile telecommunications device outputting a projection according to some embodiments.
Figure 2:
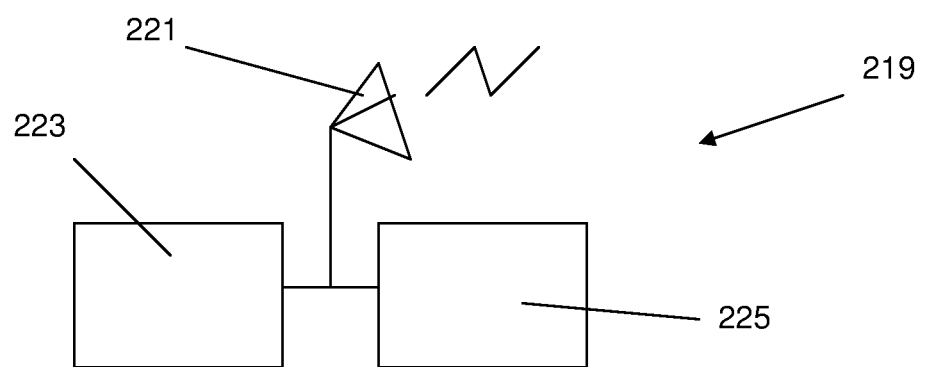

FIG. 2 illustrates an example computing device 201 that may be used in some embodiments. Computing device 201 may include a mobile computing device. Computing device 201 may include a wireless computing device. Computing device 201 may include a mobile telecommunications device. For example, the illustrated computing device 201 includes a cellular telephone device such as an iPhone, a Blackberry, a smart phone, and so on. In other embodiments, computing device 201 may include a mobile gaming device, an iPod Touch, a digital camera, an iPod Classic, a digital media player, a PSP Go, and so on. Some example mobile gaming devices are described in U.S. patent application Ser. No. 11/868,013, to Lutnick and entitled Game of chance processing apparatus, which is hereby incorporated herein by reference.

Computing device 201 may include a projector 203 that may be operable to make a projection (e.g., on one or more surfaces). Computing device 201 may include an aiming device 205 that may be operable to adjust an aim of the projector 203. Computing device 201 may include a camera 207 that may be operable to capture images and/or videos that may be used to adjust, calibrate and/or aim the projector 203. Computing device 201 may include a display 209 that may be used to present information to a user and/or receive information from a user. Computing device 201 may include a keypad 211 that may be used to receive information from a user. Computing device 201 may include a processor 213 that may be operable to execute one or more instructions as desired and/or control one or more elements of the computing device 201. Computing device 201 may include one or more communication elements 215 that may be operable to receive and/or transmit data. Computing device 201 may include one or more position elements 215 that may be operable to determine a position of computing device 201.

Computing device 201 may be configured to allow a user to make phone calls through a telecommunication system. Various technologies may be used to provide the ability to make phone calls. For example, in some embodiments, a cellular system may be used, unlicensed mobile access technology may be used, voice over IP technology may be used, and/or any other technology may be used.

Computing device 201 may be configured to allow a user to play games. In some embodiments, a game may include server based games, peer to peer gaming, and/or any other type of gaming. For example, the computing device may include a client of a gaming server such as a gaming server associated with a telecommunication system. In some embodiments, games may include multiplayer games such as a card game or video game involving a plurality of players (e.g., other players using other computing devices).

As illustrated in FIG. 2, computing device 201 may include a projector 203. Projector 203 may include a pico projector, a mini projector, a full sized projector, and/or any desired projector.

Projector 203 may include a laser projector such as those manufactured by Light Blue Optics of Cambridge, UK and Microvision of Redmond, WA. Projector 203 may include an LED projector such as those manufactured by Samsung of Ridgefield Park, NJ. Projector 203 may include any desired type of projector.

Projector 203 may include a device embedded in computing device 201. For example, in one embodiment, projector 203 may include Microvision's PicoP Display Engine. Other such projectors are available from Upstream Engineering of Encinitas, Calif. One example computing device having an embedded projector includes the Nikon Coolpix S1000pj.

Projector 203 may include an accessory projector. Some example accessory projectors that may be used in some embodiment may include Digismart manufactured by DigiSlide of Adelaide, Australia; PVPro manufactured by Light Blue Optics; SHOW WX manufactured by Microvision of Redmond, WA; and MBP200 manufactured by Samsung of Ridgefield Park, NJ. Other such projectors are available from Mitsubishi Electric of Irvine, Calif.

Projector 203 may include a matchbox-sized, sugar cube sized, and/or any desired sized projector. Projector 203 may include a video and/or image projector. In some embodiments, projector 203 may use miniature lasers to display video images that overcome some size limitations of some projection techniques. Laser projection techniques may allow for the generation and display of high-quality holograms at video frame rates. Projectors that use such techniques may be appropriate for projecting television quality videos. In some embodiments, holograms created by a projector may be created with a ferroelectric LCoS panel. The panel may create the Fourier transform of an image being projected, which when illuminated by a laser light, creates an image projected onto one or more surfaces. Some laser projection techniques may not include a lens. Some laser projection techniques may offer wide dynamic range in the light output.

Projector 203 may allow for a variable size of a projection (e.g., by adjustment of operation of the projector and/or by movement of the projector). Projector 203 may allow for variable orientation of a projection (e.g., by operation of the projector and/or by movement of the projector).

In some embodiments, depending upon a technology, a brightness, a focal length, and/or a quality of optics of projector 203, a projection may be made over a wide range of sizes (e.g., from a small private display up to a large, wall-filling movie screen).

One example projector device is described in U.S. Patent publication 2009/0135377 to Yoon, entitled Projection Display Device, which is hereby incorporated herein by reference. It should be recognized that different embodiments may include different structure and types of projectors and that the various examples of projectors are given as non limiting examples only. For example, in some embodiments, a projector may be made up of multiple sub projectors as is described in U.S. patent publication 2009/0153582 to Hajjar, entitled Laser displays Based On Color Mixing Between Colored Light And Phosphor-Emitted Visible Colored Light, which is hereby incorporated herein by reference.

In some embodiments, projector 203 may be configured to receive an indication that a projection should be made. A projection (e.g., of an image, of a video) from a processor, memory, external source, and/or any other source may be made in response onto one or more surfaces as indicated. In some embodiments, the indication may include a stream of data representing the projection. In some embodiments, the indication may include an identification of a memory location on which information representing the presentation may be stored. Making a projection may include operating a light source such that the presentation is projected onto one or more surfaces. In some embodiments, projector 203 may be able to project real-time images onto one or more surfaces. A surface may be vertical, horizontal, continuous, discrete, and so on.

In some embodiments, computing device 201 may be configured to make a projection related to a game being played by a user of computing device 201 through projector 203.

As illustrated in FIG. 2, computing device 201 may include an aiming device 205. Aiming device 205 may be a part of projector 203 and/or a separate device. Aiming device 205 may be configured to adjust an aim of projector 203.

Aiming device 205 may include a mechanical device configured to rotate projector 205, which thereby may cause a projection to rotate accordingly. Such rotation may be performed in any manner as desired by any device, such as by a gear system controlled to rotate and thereby cause projector 203 to rotate, a magnetic system configured to adjust a magnetic field so that a force is applied that causes projector 203 to rotate, and/or any electronic, and/or mechanical device used in any way.

Aiming device may include a mechanical device configured to reposition projector 203, which thereby may cause a projection to be repositioned accordingly. Such repositioning may be performed in any manner by any device, such as by a gear system that causes projector 203 to adjust a location relative to at least another part of computing device 201 when a gear is rotated, a magnetic system that causes a force to push and/or pull a portion of projector 203 thereby causing projector 203 to adjust a location relative to at least another part of computing device 201, and/or any electronic and/or mechanical device used in any way.

Aiming device 205 may be configured so that a projection may be rotated to a desired angel without rotating computing device 201, for example, by rotating the projector 203 relative to at least another part of computing device 201. Aiming device 205 may be configured so that a projection may be relocated to a desired position without relocating the computing device, for example, by repositioning at least a part of projector 203 relative to at least another part of computing device 201 (e.g., aiming the projector at an angle to the left to move the projection left, and so on).

Some embodiments may be configured to aim by changing a projection and/or changing a way that a projection is made. A change to a projection may be determined by aiming device 205, by processor 213, by a central system, by another processor (e.g., of another computing device), and/or by any device. For example, in some embodiments, a rotation of a projection may be performed by adjusting a projection made from projector 203 so that the projection may be rotated and then projected as the rotated version of the projection in addition to and/or as an alternative to rotating projector 203. As another example, in some embodiments, a repositioning of a projection may be performed by repositioning a projection from one portion of an area that may be used for projections to another area that may be used for projections. For example, projector 203 may be operable to make projections in a first area. Projector 203 may make a projection onto a first subset of the first area. To relocate the projection, projector 203 may make the projection onto a second subset of the first area. In some embodiments, this may leave an area onto which projector 203 is operable to make a projection unused at some times so that repositioning may take place in that area. Such repositioning may take place in addition to and/or as an alternative to repositioning projector 203.

Aiming may be used, for example, to steady a projection made from computing device 201. For example, a human hand holding computing device 201 may jitter and aiming may be used to steady a projection so that less jittering is noticeable in a projection made from computing device 201. Aiming may be used, for example, to locate a projection onto a surface as desired. Aiming may be used to align a projection as desired (e.g., with another projection, with another object, with any other thing). Aiming may be used to alter a presentation that includes a projection as desired.

As illustrated in FIG. 2, computing device 201 may include a camera 207. Camera 207 may include a video camera and/or a still image camera. Various examples of computing devices that include cameras are known in the art. For example, the Nikon Coolpix S1000pj is a computing device that includes a camera and a projector.

Camera 207 may be used, for example, to calibrate a projection made by the projector, to adjust, calibrate and/or aim projector 203 and/or a projection made by projector 203. U.S. patent publication number 2007/0263181 to Hying, entitled Method for Operating a Mobile Device for Projecting Image data, and Mobile Projector Device and U.S. Pat. No. 6,527,395 to Raskar, entitled Method for calibrating a projector with a camera give some example uses of a camera and a projector being used together and are hereby incorporated herein by reference.

Camera 207 may be used, for example to align a projection made by projector 203. For example, in some embodiments, an image of a projection made by projector 203 may be captured by camera 207. The image may be analyzed (e.g., by processor 213, by a central system, by a processor of a remote computing device, and/or by any other device) to determine that a projection should be repositioned to better align with another thing (e.g., another projection, an edge of a surface, a surface, and so on). The projector 203 may be controlled to adjust the projection to improve the alignment.

Camera 207 may be used, for example, to determine if a projection is output as desired. For example, in some embodiments, an image of a projection made by projector 203 may be captured by camera 207. The image may be analyzed (e.g., by processor 213, by a central system, by a processor of a remote computing device, and/or by any other device) to determine whether a projection is output as desired (e.g., in a desired location, including desired content, with a correct color scheme, with a correct brightness, and so on. The projector 203 may be controlled to adjust the projection to improve any desired characteristic so that a projection is more closely projected as desired.

In some embodiments, camera 207 may be used to determine an initial aiming for a projection. For example, an image of a surface may be taken and processed to determine an aiming of the projection that would allow the projection to fit onto the surface.

In some embodiments, camera 207 may be used to audit projections. For example, an image taken by camera 207 may be taken and transmitted to an auditing device. The auditing device may be used to determine if the desired projection was made at the time of the image being taken. Such auditing may be useful, for example to determine if an outcome of a game being played is properly displayed, to illustrate such proper display to regulatory authorities, to determine if an advertisement that is desired to be displayed is displayed, to illustrate such display to an advertiser that paid for the display, and so on.

Camera 207 may be used, for example, to determine whether projector 203 is in operation, whether projector 203 is operating correctly, and/or to diagnose a problem with projector 203. For example, in some embodiments, an image of a projection made by projector 203 may be captured by camera 207. The image may be analyzed (e.g., by processor 213, by a central system, by a processor of a remote computing device, and/or by any other device) to determine whether projector 203 is operating correctly (e.g., determine whether the projection is being made at all, determine that a particular section of a projection is not being made, determine that a brightness is not as desired, determine that a color is not as desired, and so on). If it is determined that projector 203 is not operating correctly, an indication of the determination may be transmitted (e.g., to processor 213, to a central system, and so on).

As illustrated in FIG. 2, computing device 201 may include a display 209. Computing devices with various types of displays are known in the art. The display may include, for example, an organic light emitting diode display, a liquid crystal display, and/or any desired display. The display may be used to present information to a user of computing device 201. The information, for example, may be used to play a game using computing device 201, make a phone call using computing device 201, watch a video using the computing device 201, view an image using the computing device 201, send a text message and/or multimedia message using computing device 201, present an advertisement to the user of computing device 201, and/or facilitate any desired action and/or functionality.

As illustrated in FIG. 2, computing device 201 may include a keypad 211. Computing devices with keypads are known in the art. Keypad 211 may include a numeric keypad, an alphanumeric keypad, and/or any desired keypad. Keypad 211 may be used to input information about games, emails, phone numbers, friends, contacts, text messages, tags, and/or to facilitate any desired action and/or functionality. In some embodiments, keypad 211 may include haptic output elements.

In some embodiments, computing device 201 may include one or more additional and/or alternative input device to keypad 211. For example, computing device 201 may include a mouse, track ball, scroll wheel and/or any other device. In some embodiments, movement and/or orientation may be used as input to computing device 201. Some example movement and/or orientation devices are described below. Various examples of movement and/or orientation based input are known in the art, such as in numerous applications designed for the iPhone.

In some embodiments, a display may operate as a keypad and/or other input device. For example, a touch sensitive display or multi-touch display such as one on an iPhone may be used as both an input device and an output device.

As illustrated in FIG. 2, computing device 201 may include a processor 213. Some example processors are discussed above. Various processors are known in the art.

Processor 213 may be configured to execute one or more instructions that cause the processor to perform any desired process. For example, in some embodiments, processor 213 may execute instructions that cause the processor to control projector 203 to make a projection. As another example, in some embodiments, processor 213 may be configured to receive information (e.g., from an external source, from camera 205, from location element 215, and so on), process the information, and control elements of computing device 201 and/or another computing device based on the information. Control of devices by a processor is known in the art.

In some embodiments processor 213 may be configured to receive an image of a projection being made. The image may be captured by camera 207 and transmitted by a bus or other communication network to the processor. The image may be captured by another source (e.g., a camera of another computing device, a camera of a casino, and so on) and transmitted to the processor over a communication network. The processor may process the image to determine a characteristic of the projection. Various image processing techniques are known in the art. In some example embodiments, processing may include comparing a portion of a captured image to a portion of an image in memory to determine an extent to which the images differ. The processor may determine if the characteristic of the projection is as desired (e.g., if the images do not differ by more than a threshold amount). If the characteristic is not as desired, the processor may control a projector making the projection to adjust the projection. The projector may be projector 203, a projector of another computing device, and/or any other projector.

In some embodiments, processor 213 may be configured to control display 209 to present information about a game.

In some embodiments, processor 213 may be configured to process information related to a game played using computing device 201. For example, processor 213 may receive inputs from a user of computing device 201 related to the game. Processor 213 may process the inputs, determine appropriate outputs, and control display 209 to present the outputs. For example, in some embodiments, processor 213 may determine an outcome of taking an action in a game (e.g., a next card dealt, a result of firing a virtual gun, and so on). In some embodiments, processor 213 may act as a thin client in a server based gaming system. For example, processor 213 may transmit some and/or or all information regarding inputs to a remote system. The remote system may transmit results of the input to the processor and the processor may control the display and/or other output elements to present the results. U.S. patent number U.S. Pat. No. 7,189,161, which is hereby incorporated herein by reference, describes an example thin client system.

In some embodiments, processor 213 may be configured to process data related to a projection. Some examples of processing of data are described in U.S. patent publication number 2009/0219380 to Cable entitle Method and apparatus for displaying images using holograms, and U.S. patent publication number 2009/0219591 to Cable entitled Methods and Apparatus for displaying colour images using holograms, both of which are hereby incorporated herein by reference. Another example of processing data to clarify a projection is provided in U.S. patent publication number 2008/0015804 to Baik entitled Method and apparatus for compensating for alignment mismatch of optical modulator, which is hereby incorporated herein by reference.

It should be recognized that the above descriptions of processor 213 and functionality of processor 213 are non-limiting examples only. In some embodiments, a processor may take any form and/or include any desired functionality. For example, a processor may be configured to perform any desired set of actions for computing device 201 and/or other device, act as a thin client to a remote system, act as part of a peer group of other processors, and/or facilitate any desire actions in any combination and in any capacity. In some embodiments, processor 213 may include one or more specialized processors and/or other elements of computing device 201 may act as processors and/or perform action outside of the control of processor 213.

Some embodiments may include one or more memory devices. Memory devices are discussed above. A memory may store instructions and/or data. For example, the memory may store information related to a projection by the processor. In some embodiments, information may be received from a remote source.

As illustrated in FIG. 2, computing device 201 may include a communication element 215. Communication element 215 may be operable to allow computing device 201 to communicate with one or more remote devices (e.g., a remote system, another computing device, and so on). In some embodiments, communication element 215 may receive information from a remote source and forward the information to processor 213 and/or to any other destination (e.g., directly to projector 203, to a memory using direct memory access, using a bus, and so on). Communication element 215 may receive information from processor 213 and/or any other source (e.g., camera 207, a memory location, and so on) and may forward the information to a destination (e.g., using a wireless network, and so on).

Communication element 215 may include a transceiver. Communication element 215 may include a receiver. Communion element 215 may include a transmitter. Communication element 215 may include an antenna. Communication element 215 may include a modem. Communication element 215 may include a device configure to access a cellular network. Communication element 215 may include a device configured to access a wireless data network. Various communication devices are known in the art that may be part of communication element 215.

As illustrated in FIG. 2, computing device 201 may include a position element 217. Position element 217 may be operable to determine a position of computing device 201. Position element 217 may be operable to communicate the position to processor 211, a remote system, another computing device, and so on. A position may include a location and/or an orientation. A position may include an absolute position and/or a relative position. For example, in some embodiments a position may include a location relative to another computing device, an orientation relative to another computing device, a position relative to a prior position of computing device 201, an orientation relative to a prior position of computing device 201, and/or any other desired information.

Various examples of device capable of determining an absolute and/or relative location are known in the art. For example, a global positioning system may be used in some embodiments to determine an absolute location. As another example, an accelerometer may be used to determine a movement of a device that may be used to determine a relative location compared to a prior location. As yet another example, a signal analyzer may determine a signal strength from another device to determine a relative location with respect to the other device. In some embodiments, a device configured to determine a location may include a microelectronic mechanical systems device. It should be recognized that these example deice for determining a location are given as examples only and that some embodiments may include any desired devices configured in any way.

Various examples of devices capable of determining an absolute and/or relative orientation are known in the art. In some embodiments, a device configured to determine an orientation may include s micro-electronic mechanical systems device. In some embodiments for example an accelerometer, gyroscope and/or mercury switch may be used to determine an absolute orientation and/or a relative orientation with respect to a prior orientation. In some embodiments, a signal strength analyzer may be used to determine a signal strength receive from another device to determine a relative orientation with respect to another device (e.g., a device that may be configured to transmit different signal strengths in different directions and/or when in different orientations). It should be recognized that these example deice for determining an orientation are given as examples only and that some embodiments may include any desired devices configured in any way.

Some example devices that may use position determination devices include the Apple's iPhone and Nintendo's Wii. Some examples of position devices include the KXPS5 series accelerometer offered by Kionix Inc. of Ithaca New York, and various accelerometers and/or gyroscopes offered by STMicroelectronics, which is headquartered in Geneva, Switzerland.

In some embodiments, other devices may be used to determine a position. For example, in some embodiments, camera 203 may be used to determine a position. For example, camera 203 may capture an image. The image may be analyzed (e.g., by processor 213, by a remote system, by another computing device, and so on) to determine a position (e.g., by determining if objects in the image have moved compared to a prior image, by comparing objects in the image with objects in an image of another device to determine a relative position of the two devices, and so on). In another example, a plurality of signal strengths may be used to identify a position based on relative signal strengths between the device and the source of the signals. In yet another example, an image captured from another camera may be used to determine a position (e.g., by an external source, by transmitting the image to the computing device for analysis, and so on).

As illustrated in FIG. 2, some embodiments may include a telecommunications system 219. Telecommunication system 219 may include a wireless telecommunication system. Telecommunications system 219 may include a cellular telephone system, a WiFi system, a Municipal Area Network system, a WiMax system, and so on. Telecommunication system 219, for example may include a cellular system operated by T-mobile, Verizon, or AT&T, a wireless network operated by a municipality or business establishment, and so on.

Telecommunication system 219 may include a communication device 221 configured to communicate with one or more computing devices (e.g., computing device 201). Telecommunication system 219 may include a telecommunication server 223 configured to provide telecommunication services to the one or more computing devices. Telecommunication system 219 may include a projections and/or gaming server 225 configured to provide serves related to projections and/or games to the one or more computing devices.

As illustrated in FIG. 2, telecommunication system 219 may include a communication device 221. Communication device 221 may include a wireless communication device. Communication device 221 may include a cellular tower, a signal repeater, a router, an access point, and/or any other desired communication device. Communication device 221 may communicate with communication element 215. Communication with communication element 215 may allow, for example, data transfer to and/or from communication element 215, communication device 221 and/or any thing in communication therewith (e.g., processor 213, other devices, projection and/or gaming server 225, and so on).

As illustrated in FIG. 2, telecommunication system 219 may include a telecommunication server 223. Telecommunication server 223 may provide telecommunication to one or more computing devices. For example, telecommunication server 223 may provide functionality such as authentication, edges routing, call routing, call forwarding, call connecting, DNS services, IP address services, phone related services, internet related services, and/or any other desired services.

In some embodiments, computing device 201 may be able to place calls using the telecommunication system 219. In some embodiments, computing device may be able to access the internet and/or receive and/or transmit data to and/or from remote sources using telecommunication system 219.

Various services may be provided to computing device 201 facilitated by telecommunication system 219. Such services may include, for example, GPS services, direction services, gaming services, projection services, and so on. An example of a telecommunication system providing gaming services is described in U.S. patent publication 2007/0060306 to Amaitis, entitled System and method for providing wireless gaming as a service application, which is incorporated herein by reference.

Any desired services may be provided to a computing device through telecommunication system 219. It should be recognized that telecommunications system 219 may not directly provide the services in some embodiments. For example, in some embodiments, a gaming server may be operated outside of telecommunication system 219 and telecommunications system 219 may facilitate communication between the gaming server and computing device 201. In some embodiments, such a server that provides added functionality to the computing device may be operated on behalf of the telecommunication system 219 or completely separately from telecommunication system 219.

One example service that may be provided in some embodiments includes a projection and/or gaming service, which in the illustrated example of FIG. 2 may be provided by projection and/or gaming server 225 as part of telecommunication system. In some embodiments, projection and/or gaming server 225 may be configured to determine one or more projections to be made through one or more computing devices (e.g., 201). Projection and/or gaming server 225 may be configured to control the one or more computing device to make the projections (e.g., by transmitting a request to make the projections to the respective computing devices). In some embodiments, projection and/or gaming server 225 may receive information about a position of one or more computing device and/or about actions taken in an application (e.g., a game) being used by a user of one or more computing devices. Projection and/or gaming server 225 may use such received information to determine what projection or projections to makes (e.g., to adjust an existing projection, to create an initial projection, etc.). In some embodiments, projection and/or gaming server 225 may determine outcomes of games being played by one or more computing devices and may transmit information about those results to the computing devices.

It should be recognized, that in other embodiments, a central service may be less involved in projections and/or gaming and/or not involved at all. For example, in some embodiments, a projection and/or outcome of a game may be determined in a pier to pier fashion and or locally by the computing device (e.g., a processor of the computing device) with little or no input by a central servicer.

As shown in FIG. 2, computing device 201 may make a projection 227 using projector 203. The projection may be made onto one or more surfaces 229. The projection may be part of a presentations associated with a game, movie, image, advertisement, and so on. For example, in some embodiments, a user may play a game using computing device 201 (e.g., a card game), elements of the card game may be in the projection (e.g., card values). Play of the card game may include communication with projection and/or gaming server 225 through telecommunication system 219. Computing device 201 may be controlled to make projection 227 by projection and/or gaming server 225. Similarly, other computing device may be controlled to make projections by projection and/or gaming server 225 (e.g., such as other card values in the card game). In some embodiment, the combined projections may form a presentation (e.g., a presentation of a state of a card game involving the cards projected through multiple computing devices).

In some embodiments, adjustments to a projection may be made based on actions taken by a user, repositioning of a computing device, and so on. For example, information about a an image of a projection taken by camera 205, a change in position determined by position element 217, and so on may be used to determine such an adjustment should be made. Such adjustments maybe determined by projection and/or gaming server 225 in some embodiments.

As mention above, it should be recognized that while some examples are given in terms of central server performing some actions, some embodiments may include peer to peer, master slave, and/or any other type of methods to determine actions and/or control devices.

Figure 3:
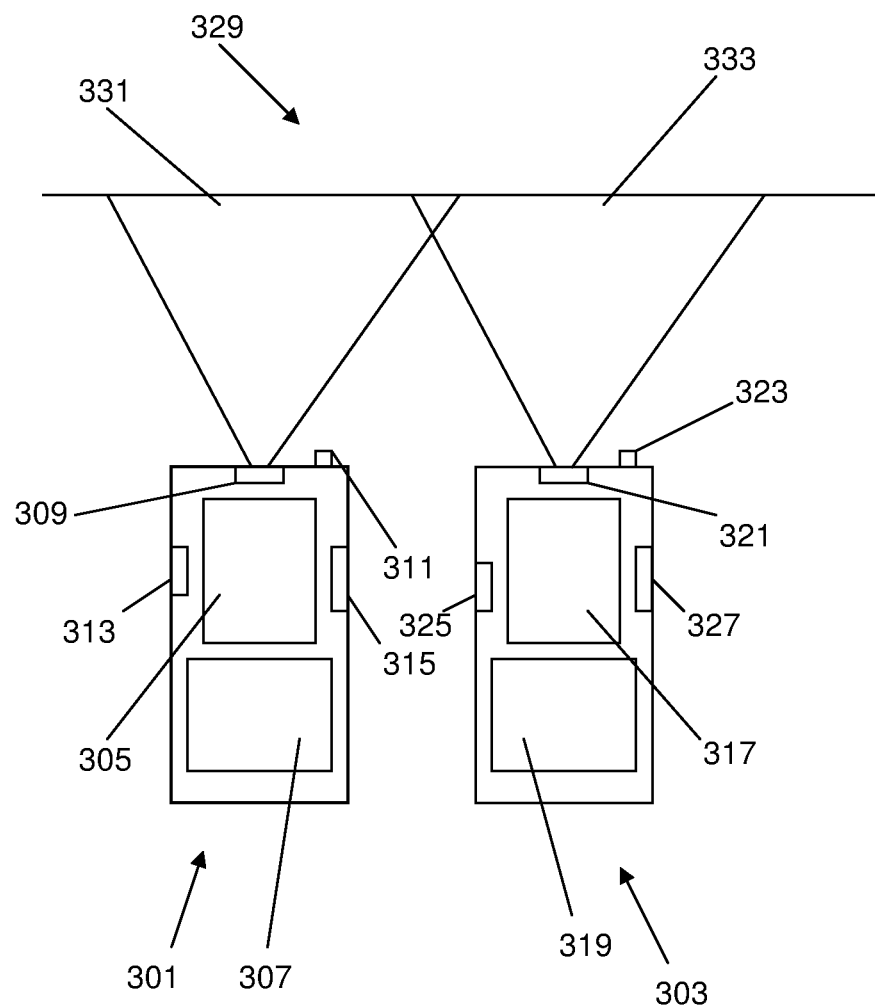
FIG. 3 shows an example of multiple mobile telecommunication devices operating together to output a presentation.

FIG. 3 shows an example embodiment that includes a first computing device 301 and a second computing device 303. In some embodiments, first computing device 301 may include a cellular phone, a mobile gaming device, and so on. First computing device 301 may include a first display 305, a first keypad 307, a first projector 309, a first camera 311, a first position element 313, and a first processor 315. In some embodiments, second computing device 303 may include a cellular phone, a mobile gaming device, and so on. Second computing device may include a second display 317, a second keypad 319, a second projector 321, a second camera 323, a second position element 325, and a second processor 327.

In some embodiments, first computing device 301 and second computing device 303 may operate together to create a presentation 329. For example, first computing device 301 may make first projection 331 using first projector 309 and second computing device 303 may make second projection 333 using second projector 321. First projection 331 and second projection 333 may together form presentations 329 that includes at least a portion of each of the projections.

It should be recognized that although the examples are given with regard to FIG. 3 in terms of two computing devices, that some embodiments may include any number of computing devices, including, for example three, four, five, and/or any number of computing devices creating a same, greater, or fewer number of projections that together form a presentation.

In some embodiments, a portion and/or an entirety of first projection 331 may overlap with a portion and/or an entirety of second projection 333 in any combination of portions and entireties. For example, in some embodiments, each of first projection 331 and second projection 333 may include a common overlapping portion that is projected similarly from each of first projector 309 and second projector 321. In some embodiments, an overlapping portion from first projection 331 and second projection 333 may not be the same and/or may be made at different times. For example, such projections may produce a holographic, moving, and/or textured effect by making different projections onto a same area. First projection 331 and second projection 333 may be made at a same or different time, such as an alternating projection that makes a blinking or flashing appearance in at least a portion of presentation 329. Such an overlapping region may provide different presentation opportunities from what are available without an overlap. Such an overlapping may allow alignment of first projection 331 and second projection 333 that may be easier than without an overlap.

In some embodiments, one projection may be made with a particular polarization and another projection may be made with a different polarization. Such an effect may allow for 3d scenes, for example.

In some embodiments, a portion and/or an entirety of first projection 331 may be embedded within a portion and/or an entirety the second projection 333 in any combination of portions and entireties. For example, in some embodiments, first projection 331 may include a background area and second projection 333 may include a character projected onto the background area. In some embodiments, first projection 331 may include an area without a projection and second projection 333 may project into the area. Embedding may allow more efficient work allocation, such as allowing a higher resolution and/or high refresh rate projector to project an area that may benefit from those qualities. Embedding may allow elements that are allowed from only one projector (e.g., purchased characters or game elements) to interact with elements that may be allowed from the other projector (e.g., characters tied to a projector).

In some embodiments, no portion of first projection 331 and second projection 333 may overlap or be embedded with or in each other. For example, first projection 331 and second projection 333 may be adjacent to one another. Such projections may make a wider or otherwise larger presentation 329 than would be possible with a single projection or overlapping or embedded projections. In some embodiments, projections may be distant from each other, such as on opposing walls, and so on. This may allow the creation of more encompassing presentations.

Some examples of multiple projections are described in U.S. patent publication number 2007/0047043 to Kapellner entitled Image Projecting Device and Method, which is hereby incorporated herein by reference.

It should be recognized that in various embodiments, any combination of non-overlapping, overlapping, embedded, and non-embedded projections may be made from any number of projectors of any number of computing devices to create a presentation. For example, in some examples, a first and second projection may be completely overlapping, a third presentation may be partially embedded in the first and second projections, and partially overlapping with a fourth projection, and a fifth projection may be distant from each of the other presentations. These five projections may form an example presentation.

In some embodiments, presentation 329 may be controlled, at least in part, by a remote source (e.g., a projection and/or gaming server), by one or more of processors 313 and 327 and/or by any other device. For example, in some embodiments, projector 309 may be controlled by a central server such as projection and/or gaming server described above, by processor 313, and/or by processor 327.

Control may include any desired behavior, such as direct control, minor influence, major influence, indirect influence, indirect control, and so on. For example, in some embodiments, a remote source may take complete and total control over projector 309 such that the remote source causes the projection to operate. In some embodiments control may include influence, so that for example, in a peer to peer example, two devices may communicate together regarding a presentation to be made and one may influence another and/or they may influence each other, thereby having shared control over each other. For example, in an embodiment where a peer to peer game is being played by computing device 201 and computing device 303, actions on computing device 301 may change projection 333 from second computing device 303. Likewise, actions taken on computing device 303 may change projection 331 from computing device 301. Each of the first computing device 301 and computing device 303 should be understood to control the projection from the other computing device in such an embodiment. In some embodiments, computing devices 301 and 303 may act in a master/slave relationship where one controls the other but not in reverse. It should be recognized that any manner and combination of controlling may be used in any embodiment.

In some embodiments, change in position of one computing device may affect a projection made by another computing device. Such a change may be made so that presentation 329 continues to have a desired characteristic after the change in position. For example in some embodiments, if first computing device 301 is rotated 90 degrees, first presentation 331 may be rotated 90 degrees in the opposite direction so that presentation 329 appears the same before and after the change in position. Similarly, as another example, if second computing device 303 is moved location one inch to the right, projection 333 may be moved one inch to the left so that the combined presentation 329 appears the same before and after the change in position. Control and determination of a change to a presentation may be made in any manner, such as by a processor, server, peer to peer, master/slave, client/server, and/or any other desired fashion.

Figure 4:
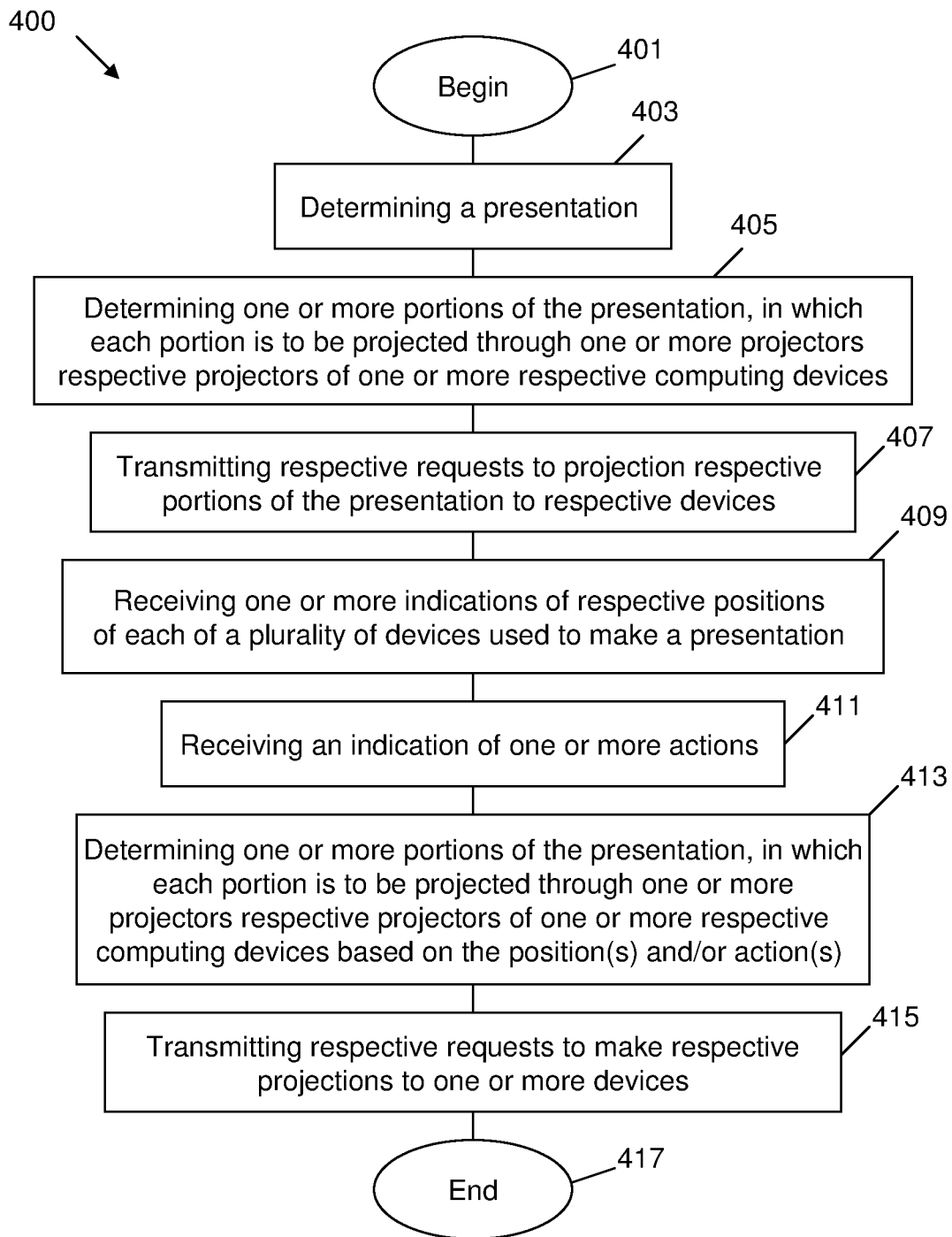
FIG. 4 shows an example process that may be performed in some embodiments.

FIG. 4 illustrates an example process 400 that may be performed in some embodiments. Process 400 may be performed to control one or more projections from one or more computing devices. Process 400 may be performed by a central server such as gaming and/or projection server described above. Process 300 may begin at block 401.

Process 400 may include determining a presentation as indicated at block 403. For example, the presentation may be related to a game being played by one or more users of one or more computing devices (e.g., a first and second computing device). For example, the presentation may include an image and/or video that represents a state of a game. The determination may be made based on a current state of a game, actions taken in a game, positions of one or more computing devices, and/or any other desired things. The presentations may include an advertisement (e.g., directed at one or more users of one or more computing devices). Various examples of advertising and targeting advertising are described in U.S. patent application Ser. No. 12/147,005 to Lutnick and entitled Method and apparatus for advertising on a mobile gaming device, which is hereby incorporated herein by reference.

Process 400 may include determining one or more portions of the presentation, in which each portion is to be projected through one or more projectors respective projectors of one or more respective computing devices, as indicated at block 405.

For example, a first portion of the presentation to be made through a projector of a first mobile telecommunication device and a second portion of the presentation to be made through a projector of a second mobile telecommunication device may each be determined. Determining the portions may include determining the portions based on information about a user and/or a device. For example a position of a user and/or device (e.g., location, orientation, etc.), a type of user or device, elements available to a device (e.g., projections purchased for use by a device and/or user), and/or any other characteristic of a user and/or device may be used to determine the portions (e.g., one device is better at projecting certain types of projections than another so the determination may be made to make projections of those types through the better projector). Determining the portion may include determining the portion based on activity on one or more of the devices (e.g., projections from a device may include a view into a virtual world and activity may include moving in the virtual world). Determining the portions may include determining the portions based on any information desired to be displayed to users of the devices, such as a movie images, advertising, etc.

In one example, determining the portions may be based on events in a game. For example, a first projection may be determined to include cards dealt to a first player and a second projection may include cards dealt to a second player. Accordingly, as cards change in the game, a determination may be made that the portions of the presentation should change based on the current cards. In another example, a first person shooter or other video game may be a basis for a presentation. In such a presentation, each portion may include a view of a particular player in a virtual game world. Accordingly, a change to the world or movement of a player may cause the portion of the presentation to change to reflect the change. It should be recognized that in various embodiments any determination may be made based on any desired reasons.

Process 400 may include transmitting respective requests to projection respective portions of the presentation to respective devices as indicated at block 407. For example, transmitting may include transmitting a first request to make a first projection of the first portion of the presentation from a first projector of a first mobile telecommunication device and transmitting a second request to make a second projection of the second portion of the presentation from a second projector of a second mobile telecommunication device. Such a request may include an indication of the portion itself. For example, in some embodiments, data may be streamed to each device. The data may include video or image footage that is then projected. In some embodiments, the request may include an indication of instructions that cause the projection to be made. In other embodiments, such a request may include an indication of a memory location that may contain the portion or instructions to cause the projection to be made. A request may include a transmission over a wireless network. It should be recognized that any desired form of a request may be made.

In some embodiments, each of the respective devices may receive the respective requests. In response to receiving the request, the devices may project the respective portion of the presentation to create the presentation. A request to make a projection may include an indication of an aiming as discussed above. For example an indication of an aiming may include an indication of an orientation of a projector, an indication of a rotation of a projection, an indication of a portion of a projection area to be used, an indication of a movement of a projector, and so on.

In some embodiments, a process that includes some or all acts up to this point in process 400 may be used to make initial projections of a presentation. In some embodiments, such a presentation may change over time as discussed above.

Process 400 may include receiving one or more indications of respective positions of each of a plurality of devices used to make a presentation as indicated at block 409. For example, an indication of a position of a first device and a mobile telecommunication device and/or an indication of a position of a second mobile telecommunication device may be received. Such indications may be received together (e.g., as one indication of a relative position). Various example devices from which such an indication may be received are discussed above (e.g., camera of a device, camera of another device, gps, gyroscope, accelerometer, and so on). It should be recognized that any indication of a position from any device or devices in any combination may be used in various embodiments. As discussed above, an indication of a position may include an indication of an absolute position, an indication of a relative position, and so on. In some examples, changes to a position of a device may relate to minor body motions as a user holds a device in his or her hands and or drastic changes to a position from a user walking, running swinging arms, and so on.

Process 400 may include receiving an indication of one or more actions (e.g., an action to take in an application associated with one or more devices) as indicated at block 411. For example, in some embodiments, an indication of an action taken in a game may be received. For example, an indication that a card should be replaced, that a bet should be made, that a gun should be fired, that an avatar should move in a direct, and so on may be received.

Process 400 may include determining one or more portions of the presentation, in which each portion is to be projected through one or more projectors respective projectors of one or more respective computing devices based on the position(s) and/or action(s), as indicated at block 413.

For example, some embodiments may include determining a first portion of a presentation to be made using a first mobile telecommunication device based on at least one of a first position and a second position and/or determine a second portion of the presentation to be made using the second mobile telecommunication device based on the first position and/or the second position in any combination.

For example, in some embodiments, a receipt that a change in position of a first device relative to a second device occurred so that the first device is now rotated 90 degrees with respect to the second device. A determination in such a situation may be made that a first projection being made through the first device should now be rotated 90 degrees.

As another example, in some embodiments, an indication that a change in a position of a first device has occurred so that the first device is now one foot higher than it once was. A determination in such a situation may be made so that a first portion is projected lower than it once was and/or that a second portion is now projected higher than it once was.

As yet another example, in some embodiments, an indication that a first and second devices have moved closer together may be received. A determination that a presentation that spans the projections of the two devices should be changed may be determined. For example, if an overlapping portion exists, then the overlapping portion may be adjusted so that the overlap is correct in view of the changed position (e.g., adjust the area projected, adjust what is projected, etc.). If an embedded portion exists, then the determination may be made to adjust the location of the embedded portion so that the presentation appears correctly. If there is supposed to be no overlap and no embedding, then a determination may be made that that first and second portions may be moved apart to avoid an overlap.

In some embodiments, a portion may be determined so that the portion appears adjacent to another portion. In some embodiments, a portion may be determined so that a presentation appears similar when one or more devices changes position.

As an even further example, a determination of a first and second portion of a presentation may be determined based on an indication of the action. For example, if an indication that a card should be drawn for a first player is received, the first portion may be determined so that it includes the card. For another example, if a user fires a virtual gun in a game played by a first device, a display on a first and second device may be change accordingly (e.g., to show a bullet, etc.).

It should be recognized that any combination of actions and/or positions may be used to determine one or more projections.

Although some examples have been given in terms of determining a change of a projection from a prior projection based on actions and/or positions, it should be recognized that a first time projection may be determined in a similar fashion. For example, a position may influence how a projection is first made.

Process 400 may include transmitting respective requests to make respective projections to one or more devices. Together the projections may make up the desired presentation. Such requests are described above.

Such requests may be received by a device. A device may process such a request and make a projection accordingly. Each device may do the same and thereby generate a desired presentation made up of each projection.

Process 400 may end at block 417. Process 400 is given as an example only and it should be recognized that any number of acts in any order may be used in various embodiments. It should also be recognized that a process may be used with any number of devices and/or any number of projects.

Figure 5:
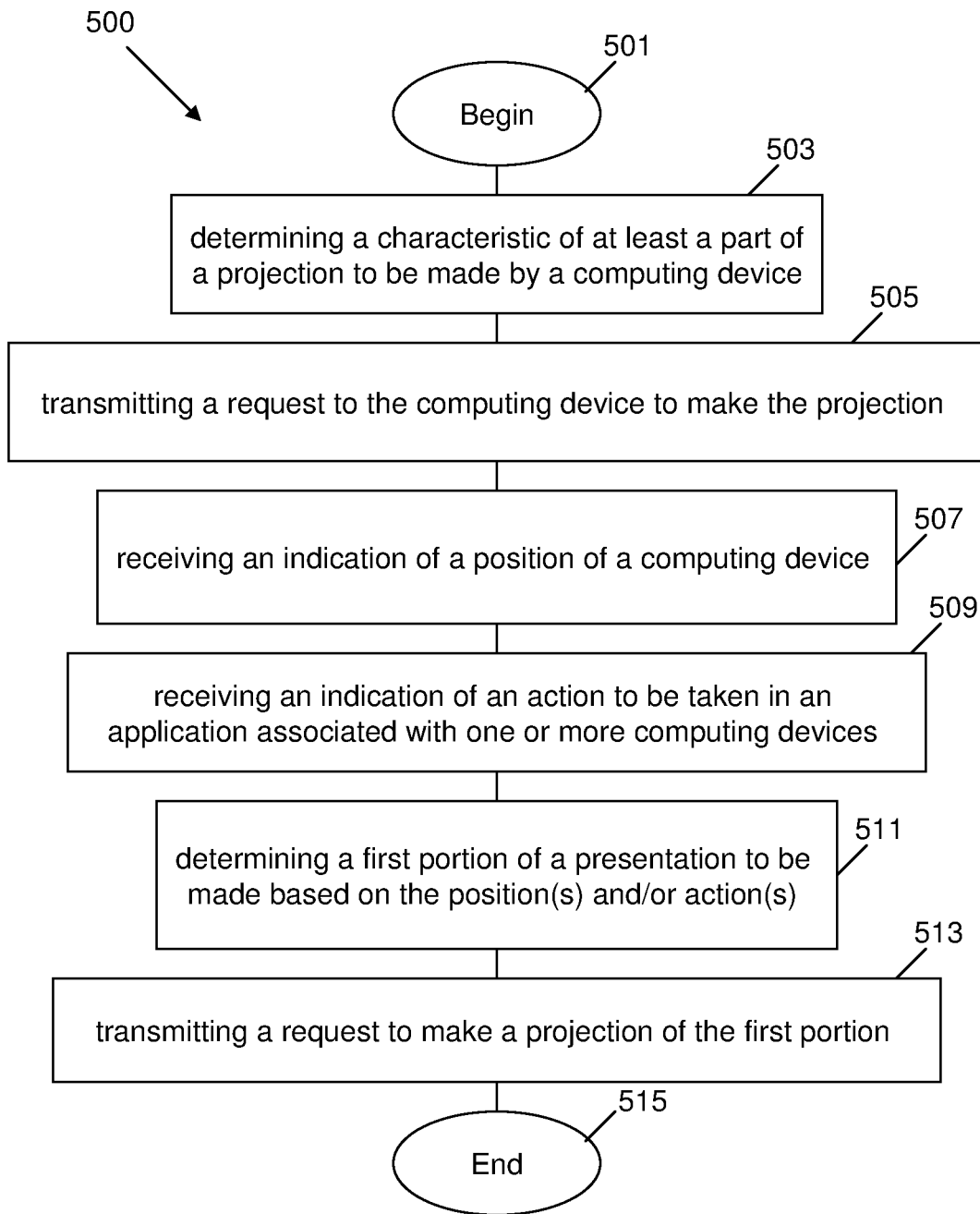
FIG. 5 shows an example process that may be performed in some embodiments

FIG. 5 illustrates another example method 500 that may be performed in some embodiments. Such a method may allow one computing device to control another computing device such as in a master/slave relationship or a peer to peer relationship. For example, such a method may be performed by a processor of a computing device (e.g., a computing device making a first projection that in combination with a projection form another computing device controlled by the first computing device forms a presentation). Process 500 may begin at block 501.

Process 500 may include determining a characteristic of at least a part of a projection to be made by a computing device, as indicated at block 503. The characteristic may include a content of the projection. The characteristic may include an aiming of the projection. The characteristic may include a layout of the projection. Such a determination may be made based on a state of an application, an advertising plan, an action in an application, a position of one or more devices, and so on.

Process 500 may include transmitting a request to the computing device to make the projection, as indicated at block 505. Such a request, for example, may be transmitted through a telecommunications network.

The computing device to which the request is transmitted, may receive the request. The computing device may make the projection as requested. The device that transmitted the request may also make a projection (e.g., a determination of a presentation may be made, a determination of the portion from block 503 and a second portion may be made similarly to the first portion, the computing device may be controlled as discussed above, and the device that makes the determination may also be controlled to make a projection of the second portion). The projection from each device may make up a presentation. Any number of devices may be controlled similarly, and/or any number of projections may make up the presentation.

Process 500 may include receiving an indication of a position of a computing device (e.g., the computing device to which the request was transmitted and/or the computing device that transmitted the request), as indicated at block 507. Various examples of such an indication and such positions are discussed above. In one example, the indication may be of a relative position to the computing device receiving the indication. In one example, the indication may include an image from a camera (e.g., a camera of the computing device performing process 500, a camera of a computing device whose position is indicated).

Process 500 may include receiving an indication of an action to be taken in an application associated with one or more computing devices (e.g., the computing device to which the request was transmitted and/or the computing device that transmitted the request), as indicated at block 509. Various examples of such an indication and such actions are discussed above.

Process 500 may include determining a first portion of a presentation to be made based on the position(s) and/or action(s), as indicated at block 511. Some examples of such a determination are described above. The first portion may include a portion associated with a computing device (e.g., the computing device to which the request was transmitted and/or the computing device that transmitted the request).

Process 500 may include transmitting a request to make a projection of the first portion, as indicated at block 513. Examples of such a request are described above. Such a request may be received by a computing device and the computing dev ice may make such a projection in response.

Some embodiments may include controlling the projection of a device that makes the determination to make a projection of the first portion and/or a projection of a second portion that together with the first portion makes up the presentation. Various examples of determining and/or exemplary projection characteristics are described above.

Although examples of process 500 are described with respect to altering a projection in response to position and/or actions, projections may initially be determined based on positions and/or actions.

Although process 500 may end at block 515. Process 500 is given as an example only and it should be recognized that any number of acts in any order may be used in various embodiments. It should also be recognized that a process may be used with any number of devices and/or any number of projects.

Although process 400 and process 500 are described as separate process, it should be understood that in various embodiments, control of projections may take any form, including a combination of central control and distributed control. As one example, in some embodiments, changes to positions may be controlled by devices in a distributed fashion and changes related to actions may be controlled by a central system.

In one example presentation made from two devices, the presentation may include a presentation of a game played by users of the two devices. In this example, the game may include a boxing game, but it should be understood that any game may be played (e.g., card games, casino games, video games, and so on). One user may operate a first fighter and a second user may operate a second fighter. The presentation may include both fighters. As actions in the game occur, the presentation may update to show the actions (e.g., punches, dodges, and so on). In some embodiments, one fighter may be projected from a first device and the second fighter may be projected from a second device. In some embodiments, one portion of a boxing area may be projected from a first device and a second portion of the boxing ring may be projected from a second device. Such a projection of portions may include one, both, or no boxers depending on the state of the game.

In some embodiments, users may purchase or otherwise associate avatars or characters to a computing device (e.g., such as by buying a character similar to buying a ring tone for a cell phone). In some embodiments, such characters may be used in games involving that computing device. In some embodiments, such characters may be limited to projection from the purchasing device. In some embodiments, such characters may be projected from other devices when those other devices are involved in a presentation that includes the device. For example, in the boxing example, a player may purchase a boxer to use in the game, may develop the boxer over games, and may use the boxer against other players. When using that boxer, the device of the player and/or other devices involved in a boxing round may project the character.

Although various examples of processes, devices, and so on are described herein, it should be recognized that these are non-limiting examples only and that other embodiments may include some, all, or none of the described examples in any order and in any combination.

XIX. Further Embodiments

The following should be interpreted as embodiments, not as claims.

A. An apparatus comprising:
a processor configured to execute a plurality of instructions; and
a memory on which the plurality of instructions are stored, in which the instructions, when execute, cause the processor to:
receive an indication of a first position of a first mobile telecommunication device;
receive an indication of a second position of a second mobile telecommunication device;
determine a first portion of a presentation to be made using the first mobile telecommunication device based on the first position and the second position;
determine a second portion of the presentation to be made using the second mobile telecommunication device based on the first position and the second position;
transmit a first request to make a first projection of the first portion of the presentation from a first projector of the first mobile telecommunication device; and
transmit a second request to make a second projection of the second portion of the presentation from a second projector of the second mobile telecommunication device.

A.1. The apparatus of claim A, in which the first position includes at least one of a first location and a first orientation, and the second position includes at least one of a second location and a second orientation.

A.2. The apparatus of claim A, in which the indication of the first position and the indication of the second position are received together as one indication of a relative position of the first mobile telecommunication device to the second mobile telecommunication device.

A.3. The apparatus of claim A, in which the indication of the first position includes an image captured by a camera of the first mobile telecommunication device and the indication of the second position includes an image captured by a camera of the second mobile telecommunication device.

A.4. The apparatus of claim A, in which the indication of the first position includes a gps location of the first mobile telecommunication device and the indication of the second position includes a gps location of the second mobile telecommunication device.

A.5. The apparatus of claim A, in which the presentation includes a display of information related to a video game being played by a first user of the first device and a second user of the second device.

A.5.1. The apparatus of claim A.5, in which the first portion includes a part of the video game associated with the first user, and in which the second portion includes a part of the video game associated with the second user.

A.6. The apparatus of claim A, in which the first portion includes an overlapping part with the second portion.

A.7. The apparatus of claim A, in which the first portion includes an embedded part in the second portion.

A.8. The apparatus of claim A in which the plurality of instructions, when execute, cause the processor to:
receive an indication of a third position of the first mobile device and adjust the first portion in response.

A.9. The apparatus of claim A in which the plurality of instructions, when execute, cause the processor to:
receive an indication of a third position of the first mobile device and adjust the second portion in response.

A.10. The apparatus of claim A, in which the plurality of instructions, when execute, cause the processor to:
receive an indication of an action to take in an application associated with the first and second devices and adjust at least one of the first and second portions in response.

A.11. The apparatus of claim A, in which determining the second portion includes determining the second portion such that the second portion appears adjacent to the first portion.

A.12. The apparatus of claim A, in which determining the first and second portions includes determining the first and second portions so that the presentation appears similar when the first and second devices are in the respective first and second positions to when the first and second devices where in prior first and second positions.

B. A first mobile telecommunication device configured to:
receive an indication of a position of a second mobile telecommunication device;
determine a first portion of a presentation to be made using the first mobile telecommunication device based on the position;
determine a second portion of the presentation to be made using the second mobile telecommunication device based on the position;
control a first projector of the first mobile telecommunication device to project the first portion of the presentation; and
transmit a request make a projection of the second portion of the presentation from a second projector of the second mobile telecommunication device to the second telecommunication device.

B.1. The apparatus of claim B, in which the position includes at least one of a location and an orientation.

B.2. The apparatus of claim B, in which the indication of the position includes an indication of a position relative to the first mobile telecommunication device.

B.3. The apparatus of claim B, in which the indication of the position includes an image captured by a camera of the second mobile telecommunication device.

B.4. The apparatus of claim B, in which the indication of the position includes an image captured by a camera of the first mobile telecommunication device.

B.5. The apparatus of claim B, in which the indication of the first position includes a gps location of the second mobile telecommunication device.

B.6. The apparatus of claim B, in which the presentation includes a display of information related to a video game being played by a first user of the first device and a second user of the second device.

B.6.1. The apparatus of claim B.6, in which the first portion includes a part of the video game associated with the first user, and in which the second portion includes a part of the video game associated with the second user.

B.7. The apparatus of claim B, in which the first portion includes an overlapping part with the second portion.

B.8. The apparatus of claim B, in which the first portion includes an embedded part in the second portion.

B.9. The apparatus of claim B in which the plurality of instructions, when execute, cause the processor to:
receive an indication of a third position of the first mobile device and adjust the first portion in response.

B.10. The apparatus of claim B in which the plurality of instructions, when execute, cause the processor to:
receive an indication of a third position of the first mobile device and adjust the second portion in response.

B.11. The apparatus of claim B, in which the first mobile telecommunication device is further configured to:
receive an indication of an action to take in an application associated with the first and second devices and adjust at least one of the first and second portions in response.

B.12. The apparatus of claim B, in which determining the second portion includes determining the second portion such that the second portion appears adjacent to the first portion.

B.13. The apparatus of claim B, in which determining the first and second portions includes determining the first and second portions so that the presentation appears similar when the second device is in the position to when the second device was in a prior position.

What is claimed is:

1. An apparatus comprising:
at least one processor configured to control:
determining a first portion of a presentation to be made using a first mobile computing device based on a first position of the first mobile computing device;
determining a second portion of the presentation to be made using a second mobile computing device;
transmitting, to the first mobile computing device, a first request to present the first portion of the presentation through the first mobile computing device; and
transmitting, to the second mobile computing device, a second request to present the second portion of the presentation through the second mobile computing device.

2. The apparatus of claim 1, in which the first position includes at least one of a first location or a first orientation.

3. The apparatus of claim 1, in which the first position is a relative position of the first mobile computing device to the second mobile computing device.

4. The apparatus of claim 1, in which the first position is based on a first image captured by a first camera.

5. The apparatus of claim 1, in which the first portion includes a view of a first player in a virtual game world and the second portion includes a view of a second player in the virtual game world, the first player being different from the second player.

6. The apparatus of claim 1, in which the presentation includes a view into a virtual world from at least one of the first mobile computing device or the second mobile computing device.

7. The apparatus of claim 1, in which the presentation includes a display of information related to a video game being played by a first user of the first mobile computing device and a second user.

8. The apparatus of claim 7, in which the first portion includes a part of the video game associated with the first user, and in which the second portion includes a part of the video game associated with the second user.

9. The apparatus of claim 1, in which the first portion includes at least one of an overlapping part with the second portion or an embedded part in the second portion.

10. The apparatus of claim 1, in which the at least one processor is configured to control:
determining a second position of the first mobile computing device and adjust at least one of the first portion or the second portion in response.

11. The apparatus of claim 1, in which the at least one processor is configured to control:
receiving an indication of an action to take in an application associated with the first and second mobile computing devices and adjust at least one of the first portion or the second portion in response.

12. The apparatus of claim 1, in which the first portion is determined such that the second portion appears adjacent to the first portion.

13. The apparatus of claim 1, in which the first portion is determined such that the presentation appears similar when the first mobile computing device is in the first position to when the first mobile computing device was in a prior first position.

14. The apparatus of claim 1, in which the first portion includes a projection to be made through a first projector coupled to the first mobile computing device.

15. An apparatus comprising:
controlling, by at least one processor:
determining a first portion of a presentation to be made using a first mobile computing device based on a first position of the first mobile computing device;
determining a second portion of the presentation to be made using a second mobile computing device;
transmitting, to the first mobile computing device, a first request to present the first portion of the presentation through the first mobile computing device; and
transmitting, to the second mobile computing device, a second request to present the second portion of the presentation through the second mobile computing device.

* * * * *